Dec. 30, 1952   E. G. LIVESAY   2,623,742
PIPE-CUTTING MACHINE
Filed Jan. 27, 1949   11 Sheets—Sheet 1

Everett G. Livesay Inventor

By Slough & Slough
Attorneys

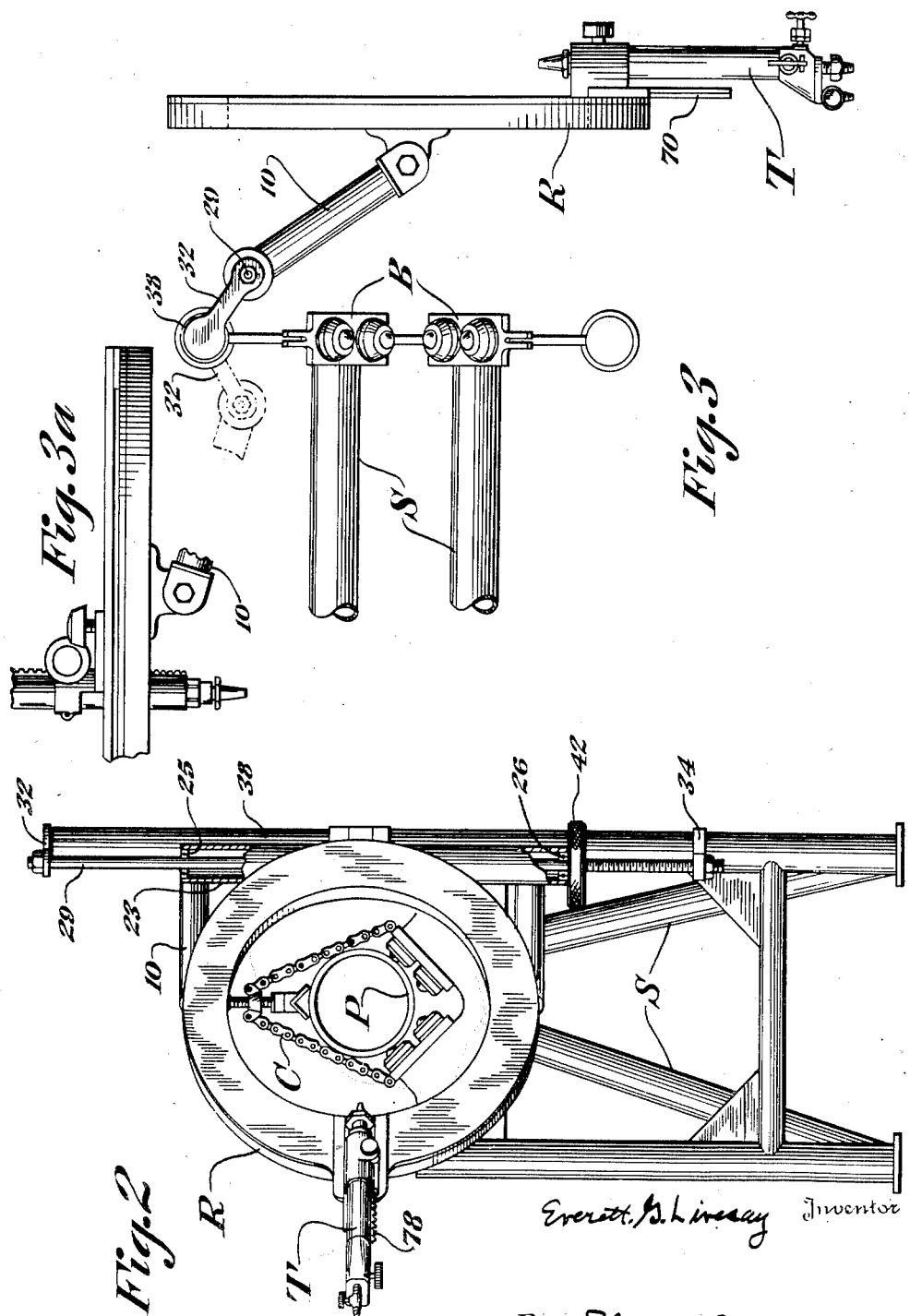

Dec. 30, 1952          E. G. LIVESAY          2,623,742
PIPE-CUTTING MACHINE
Filed Jan. 27, 1949                    11 Sheets-Sheet 3
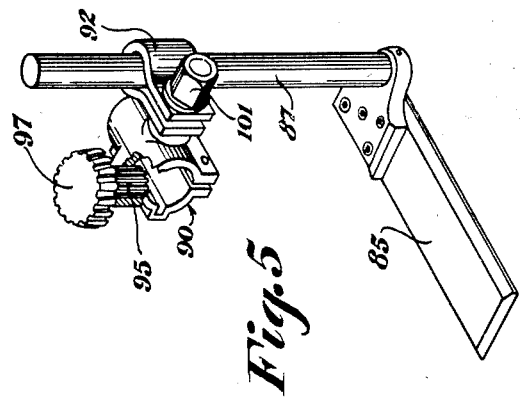
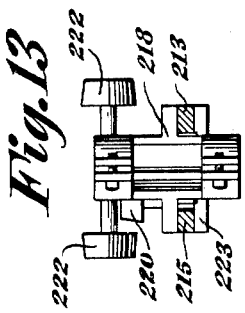
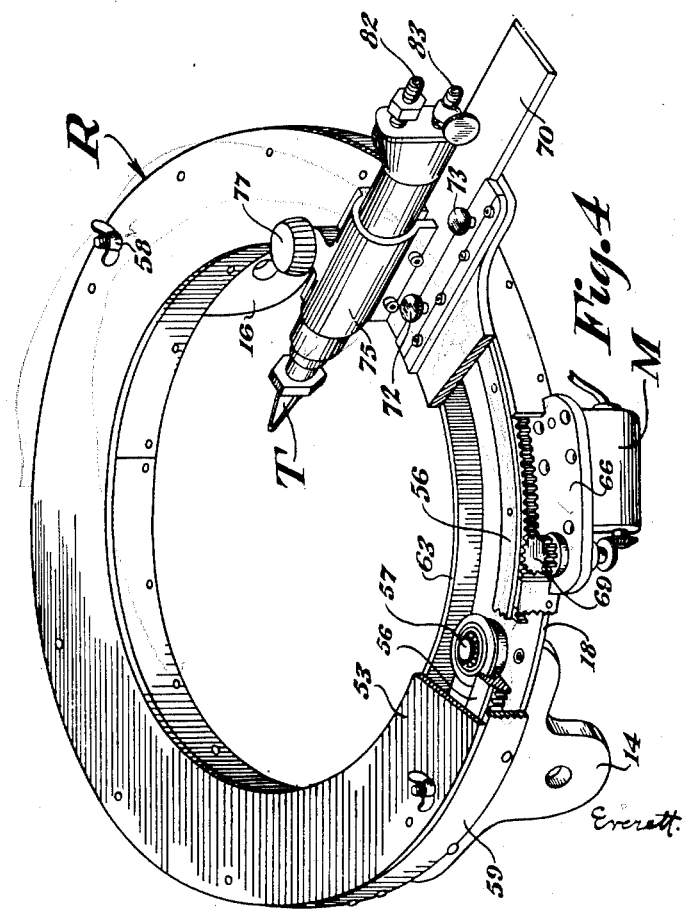
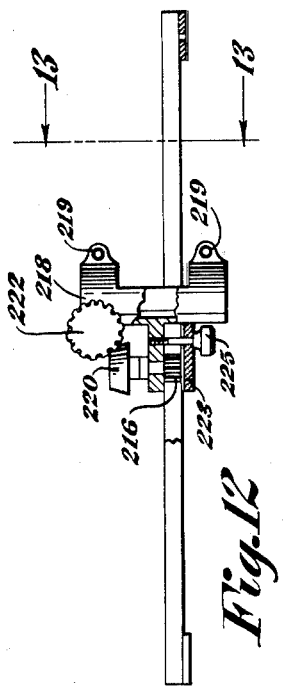
Everett G. Livesay Inventor
By Slough + Slough
Attorneys Dec. 30, 1952     E. G. LIVESAY     2,623,742
PIPE-CUTTING MACHINE
Filed Jan. 27, 1949     11 Sheets—Sheet 4
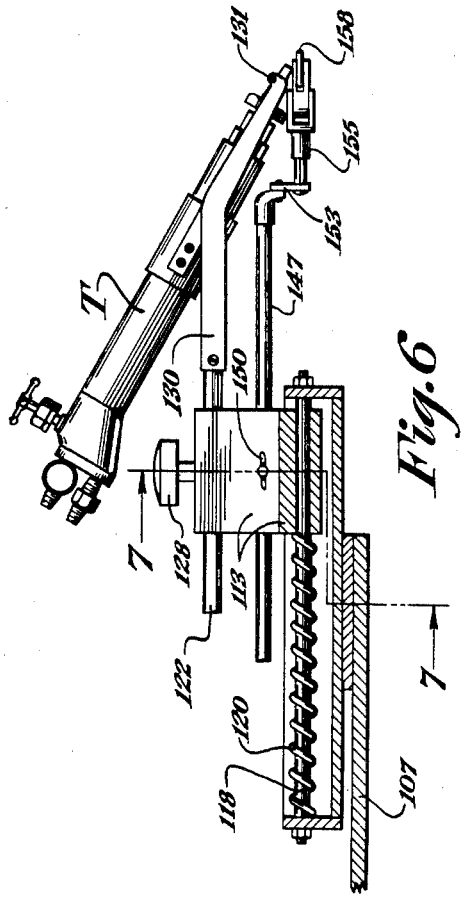
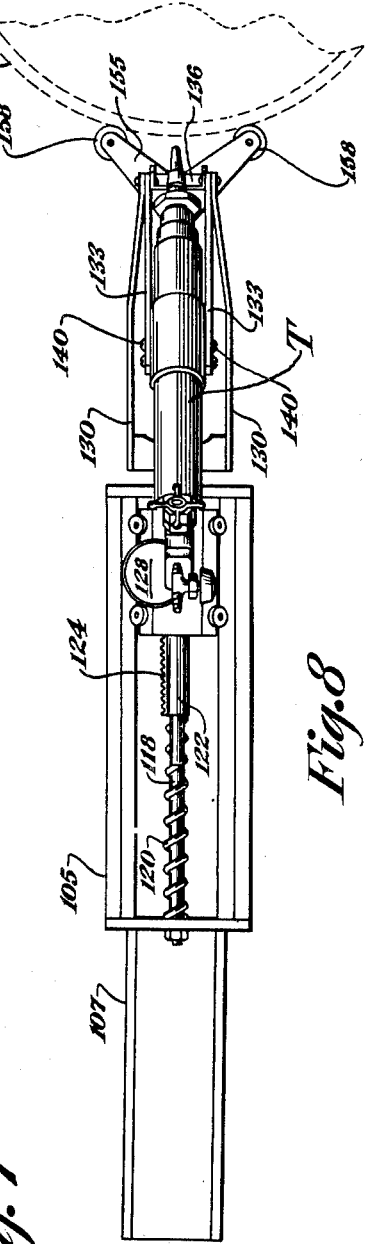
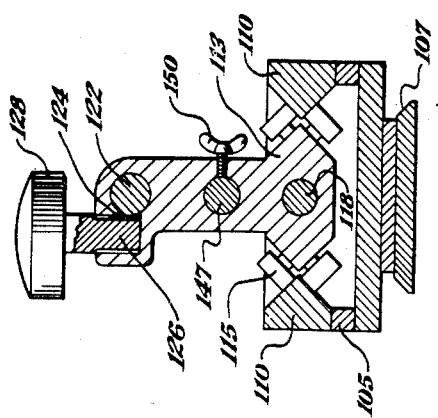
Everett G. Livesay Inventor
By Slough & Slough
Attorneys

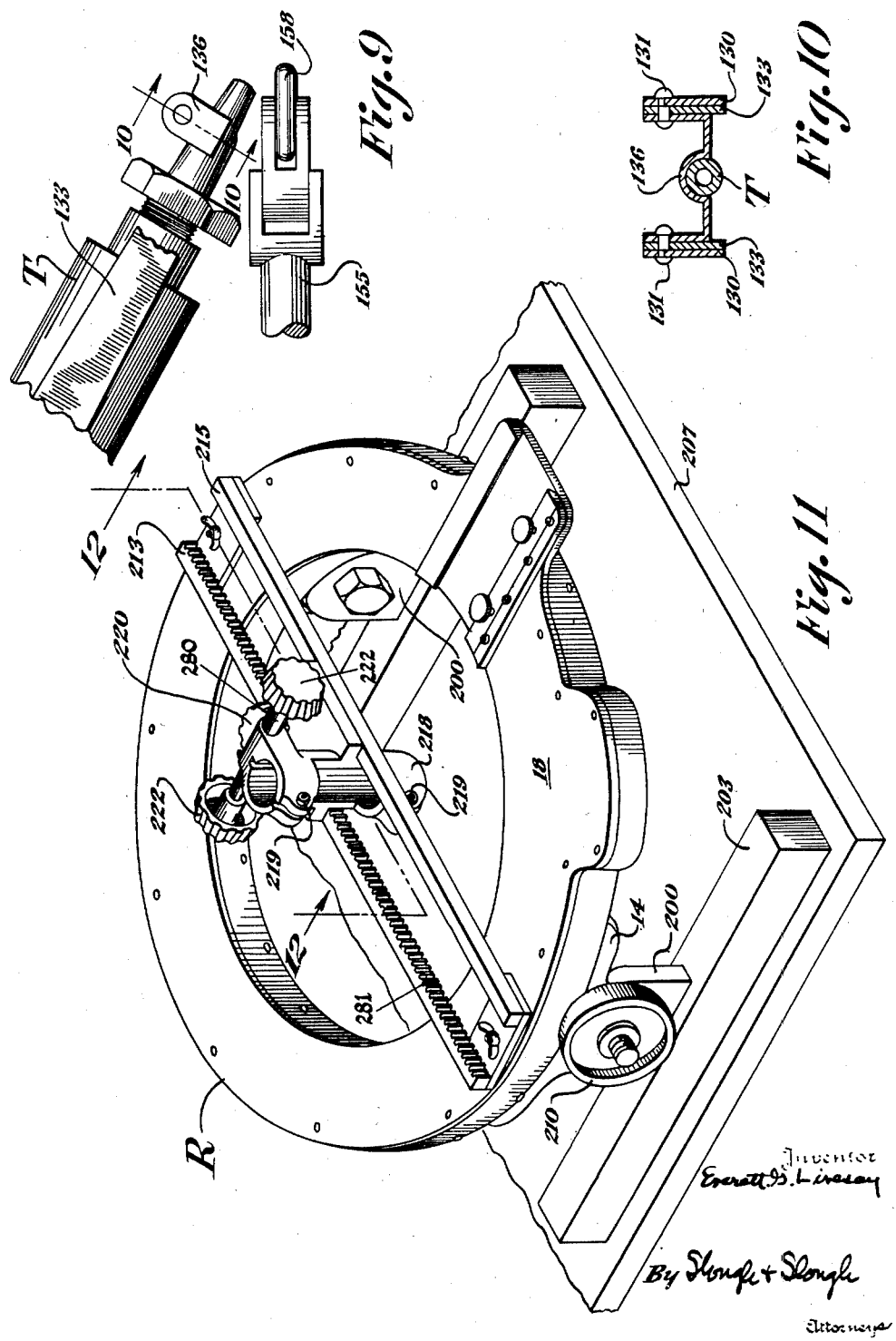

Dec. 30, 1952     E. G. LIVESAY     2,623,742
PIPE-CUTTING MACHINE
Filed Jan. 27, 1949     11 Sheets-Sheet 6
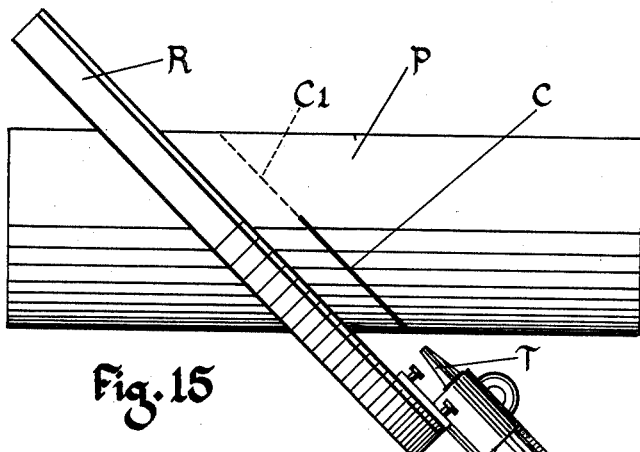
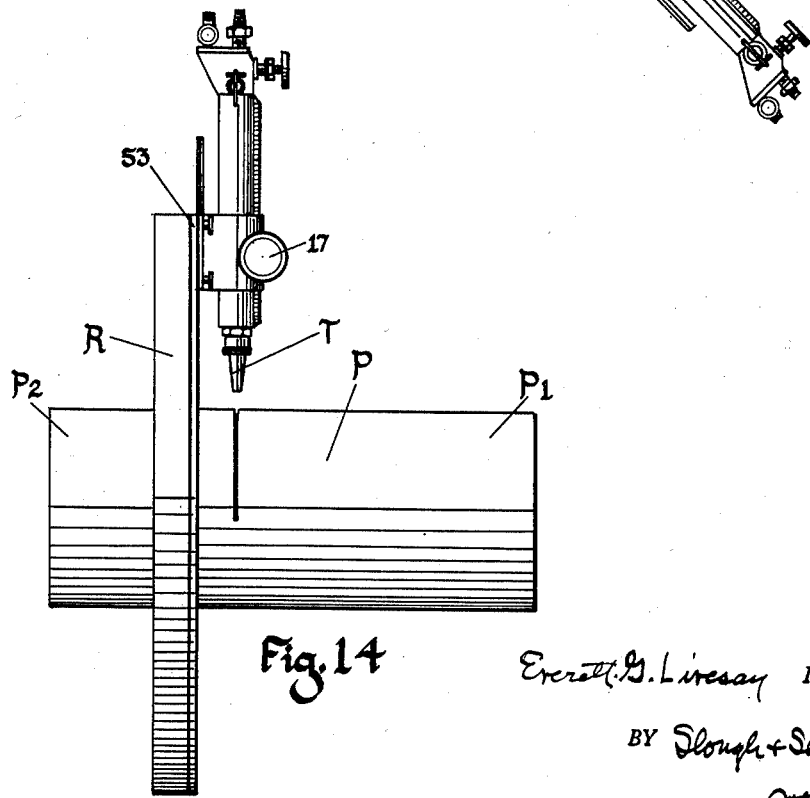

Dec. 30, 1952   E. G. LIVESAY   2,623,742
PIPE-CUTTING MACHINE
Filed Jan. 27, 1949   11 Sheets-Sheet 7

Everett G. Livesay INVENTOR.
BY Slough & Slough
Attorneys

Dec. 30, 1952     E. G. LIVESAY     2,623,742
PIPE-CUTTING MACHINE

Filed Jan. 27, 1949     11 Sheets-Sheet 8

INVENTOR.
Everett G. Livesay
BY Slough & Slough
Attorneys

Dec. 30, 1952 E. G. LIVESAY 2,623,742
PIPE-CUTTING MACHINE
Filed Jan. 27, 1949 11 Sheets-Sheet 9

Everett G. Livesay INVENTOR.
BY Slough + Slough
Attorneys

Dec. 30, 1952  E. G. LIVESAY  2,623,742
PIPE-CUTTING MACHINE
Filed Jan. 27, 1949  11 Sheets-Sheet 11

Everett G. Livesay INVENTOR.
BY Slough & Slough
Attorneys

Patented Dec. 30, 1952

2,623,742

UNITED STATES PATENT OFFICE 2,623,742

PIPE-CUTTING MACHINE

Everett G. Livesay, Coral Gables, Fla., assignor to Livesay Industries, Inc., Miami Beach, Fla., a corporation of Florida Application January 27, 1949, Serial No. 73,071

10 Claims. (Cl. 266—23)

This invention relates to pipe cutting machines and more particularly to a machine for motivating a welding or cutting torch of the oxyacetylene type.

It is an object of my invention to provide a mechanism of a simple and rugged structure for cutting pipe by means of the action of a conventional oxyacetylene torch.

It is another object of my invention to provide a medium of the class described having considerable versatility insofar as cutting pipe at predetermined angles and bevels are concerned.

A further object of my invention is to provide a pipe-cutting machine which is entirely automatic once the cutting process has been started and which requires a minimum of skill and effort in adjusting to cut any ordinary size of pipe in planes either perpendicular to the axis thereof or at acute angles, as selected for particular purposes.

My invention will now be described in detail in conjunction with the accompanying drawings in which:

Fig. 2 is a front view thereof;

Fig. 3 is a partial top plan view;

Fig. 3a is a partial plan view of the torch-carrying assembly with a modified form of torch holder, the view being so placed with respect to Fig. 3 to show the position of the torch-carrying assembly when cutting into the side of a pipe;

Fig. 4 shows the details of the torch-carrying assembly;

Fig. 5 is a perspective view of one form of torch holder;

Fig. 6 is a side view partly in section of a torch-holding mechanism particularly adapted for cutting pipe at angles other than perpendicular to the axis;

Fig. 7 is a section through 7—7 of Fig. 6;

Fig. 8 is a plan of the structure shown in Fig. 6;

Fig. 9 is an enlarged view of certain of the elements shown in Fig. 6;

Fig. 10 is a section through 10—10 of Fig. 9;

Fig. 11 shows the manner in which a portion of my invention may be adapted for cutting circles from plate;

Fig. 12 is a partial section through 12—12 of Fig. 11;

Fig. 13 is a section through 13—13 of Fig. 12;

Fig. 14 shows in side elevation the application of my improved mechanism, the manner in which the mechanism of Figs. 1 to 6 may be employed for cutting a pipe at the angle of 90° to the axis of the pipe;

Fig. 15 is a view substantially like that of Fig. 14 but showing the mechanism in position to make a diagonal planular cut through a pipe wall;

Figure 1:
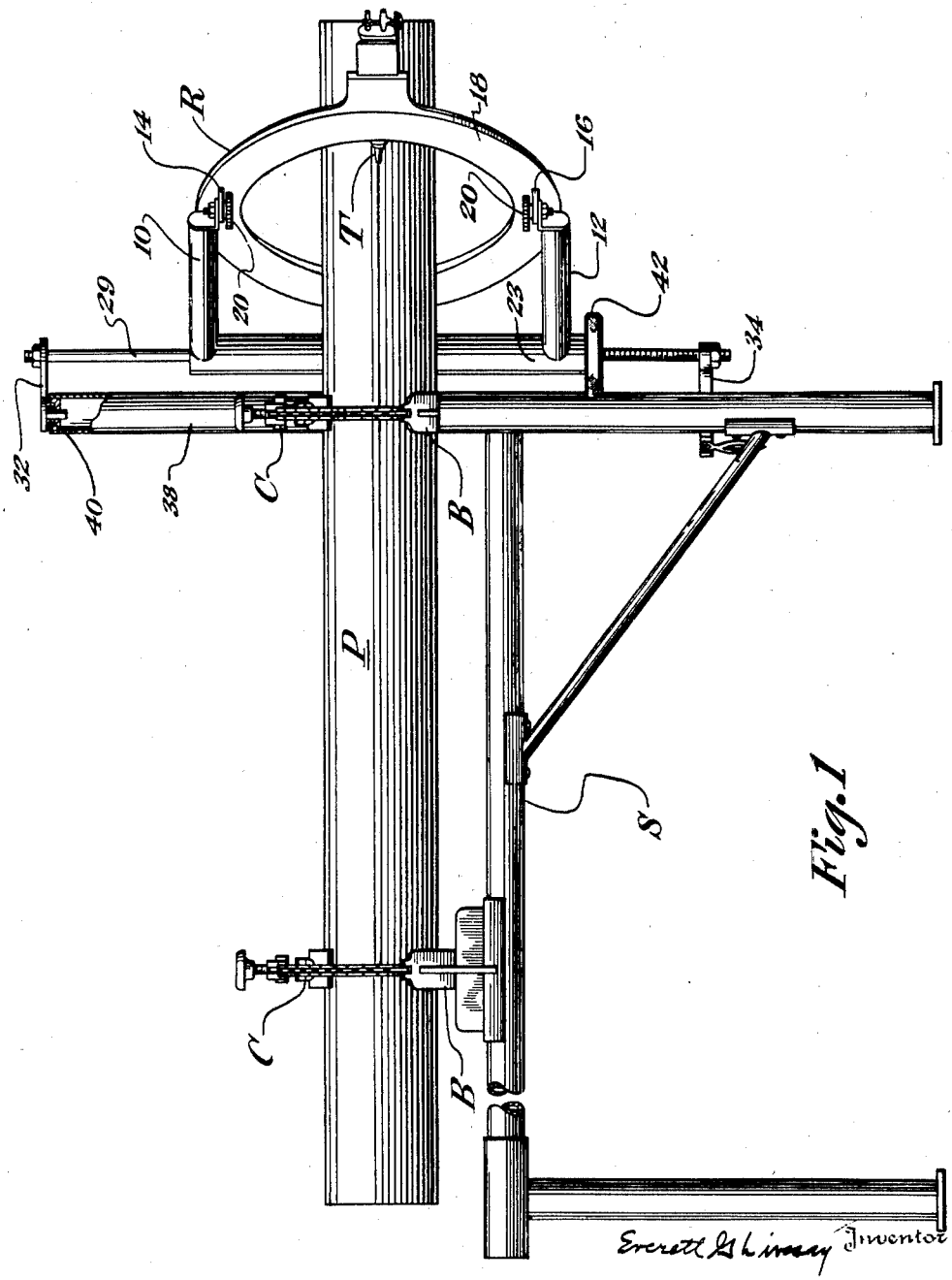
Figure 1 is a side elevation of my machine.

Figs. 23 to 29 inclusive show, in side elevational view, various pipe formations including pipes with branches, which supply examples of useful applications of the mechanism of my invention when separated according to the disclosures of Figs. 14 to 21, inclusive.

In the following description like reference characters refer to corresponding parts as found on the several modifications disclosed.

With reference to Figs. 1 through 5, my invention comprises a stand S of suitably rigid design having bearing members B adapted to support a pipe P in horizontal position. Conventional clamp and chain arrangements C are utilized to hold the pipe securely on stand S. Mounted on stand S is a ring R adapted to support an oxyacetylene torch T of conventional type. Ring R is mounted on stand S by means of upper and lower swinging arms 10 and 12, respectively, which arms are secured to ring R by means of lugs 14 and 16, respectively, formed integral with a nonrotary portion 18 of the ring. (Figs. 1 and 4.) Ring R is pivotally associated with the arms 10 and 12, free to swing about a vertical axis, and may be secured in any angular position with respect thereto by means of thumb screws 20. Arms 10 and 12 are integrally secured to a post 23 which is pivotally mounted in bearings 25 and 26 (Fig. 2) about a vertical rod 29 secured between a pair of links 32 and 34 (Figs. 1 and 3). Links 32 and 34 are pivotally secured to a post 38 forming a leg of stand S, preferably in bearings such as the bearing 40 as shown in Fig. 1. Post 23 may be raised up or down on rod 29 by means of a manually operated hand wheel 42 for raising or lowering ring R to center it with respect to any diameter pipe within the limits of the ring. Further, it will be clear from consideration of Figs. 3 and 3a that ring R may be swung from the position shown in Fig. 3 for cutting peripherally around a pipe to the position shown in Fig. 3a for cutting an aperture in the wall of a pipe. Likewise, it will be seen that torch T is rotatable about its own support with respect to ring R by means hereinafter described in connection with Fig. 5.

With reference now to Fig. 4, ring R is seen to comprise, in addition to the nonrotary or stator ring 18, a rotor ring 53 integrally secured to a ring gear 56 supported on angularly spaced roller bearings 57. Gear 56 is secured to ring 53 by rivets 58. A skirt 59 secured to stator ring 18 houses the outer periphery of ring R between rings 18 and 53, while a skirt 63 secured to ring 18 houses the inner periphery. A motor platform 66 is secured to stator ring 18, and a pinion gear 69 is rotatively carried by plate 66 and may be assumed to be driven by a motor M for the purpose of driving gear 56 to cause rotation of ring 53. The torch T is secured to rotary ring 53 on a sliding block 70 adapted to reciprocate radially with respect to ring 53 and to be secured in adjusted position for any particular diameter of pipe by thumb screws 72 and 73. Torch T is shown in Fig. 4 as held in a collar 75 on slider block 70 and is radially adjustable with respect to ring R by means of pinion knob 77 and rack teeth 78. It will be appreciated that with rubber hoses affixed to couplings 82 and 83 and leading with sufficient length to oxygen and acetylene tanks, torch T is free to revolve around pipe P (Fig. 2) when pinion 69 (Fig. 4) is actuated by the motor, M.

In Fig. 5 a further means for mounting the torch T on ring R is illustrated, using a slide block 85 which is substantially the same as slide block 70 of Fig. 4 but which carries a post 87 rigidly secured thereto upon which a torch-carrying clamp 90 is secured by means of an adjustable clamp 92 encircling post 87. Clamp 90 carries a pinion 95 rotatable by a knob 97 which may be assumed to effect reciprocal actuation of a rack such as the rack 78 of Fig. 2 secured on the torch body. The structure of Fig. 5 is more versatile than that shown in Fig. 4 to the extent that the axis of the torch may be set angularly with respect to the plane of ring R by means of the adjusting nut 101 in an obvious manner so that the cut produced on a pipe will be provided with any desired bevelled edge.

With reference now to Figs. 6 through 10, there is illustrated a structure for carrying torches particularly adapted for cutting pipe in planes at angles other than right angles with respect to the axis thereof. In Fig. 6 an elevation of the structure is shown which is seen to comprise a cradle 105 secured to a slide block 107 similar to the slide blocks 70 or 85 of Figs. 4 and 5, respectively, and which may be assumed to be adjustably disposed on a ring in accordance with teaching hereinabove set forth. Cradle 105 has V-shaped sides 110 which support a slidable torch support 113 carrying a plurality of rollers 115 arranged to engage the sides 110. A rod 118 passes through support 113 and is secured at its ends to the end walls of carriage 105 as shown in Fig. 6. A spring 120 is compressed between the rear wall of carriage 105 and support 113 and serves to bias the support 113 to maximum forward position. Slidably disposed in support 113 is a rod 122 having rack teeth 124 adapted to engage a pinion 126 upon rotation of a knob 128. Rod 122 has a pair of link members 130 secured rigidly thereto. Pivotally secured by rivets 131 at the extremities of links 130 are a pair of link members 133, there being a bracket 136 disposed therebetween, as best shown in Fig. 10. Bracket 136 serves to hold the links in properly spaced relation at their outer extremity and also serves as a retaining means for the nozzle of torch T which is supported by being integrally secured as by screws 140 to the opposite ends of links 133. Thus it will be seen that torch T is pivoted about an axis through the rivets 131 which will be assumed to be sufficiently tight to hold links 130, 133 and brackets 136 together for structural purposes but not so tight as to interfere with pivotal motion of torch T about their axis. Also supported in member 113 is a rod 147 adapted to be secured therein by a thumb screw 150. Rod 147 carries at its outer extremity a bracket 153 to which is secured a member 155 having a Y-shape, each leg of which carries a rotatable wheel or disc 158.

The rivets 131 pivotally securing links 130 and 133 have an eccentric portion 160 passing through one of the link members. By reason of this eccentric mounting the torch when pivoted will not only rock about the axis of the pivot but will also be bodily moved forward or backward to compensate for the arcuate movement of the tip and thereby maintain the tip in substantially the same position with respect to the wheels 158 and the pipe regardless of the angle to which the torch is tilted.

When it is desired to cut a pipe in a plane askew to the axis thereof, the structure of Figs. 6 through 8 is adjusted so that wheels 158 rest on the surface of the pipe, the nozzle of the torch T being directed between the wheels at the surface of the pipe as shown in Fig. 8. As the torch T revolves about the pipe in the plane of cutting, wheels 158 acting through rod 147 force support 113 against the bias of spring 120 so that the nozzle of the torch remains substantially at the same distance from the surface of the pipe as the cut progresses.

With reference now to Figs. 11, 12 and 13, there is disclosed a ring R identical with that as shown in Fig. 4 but having means adapting it for cutting circular openings in plate material. In this instance ring R is mounted on trunnions 200 integrally secured to blocks 203 which rest on a plate 207 in which a circular opening is to be cut. Ring R may be fastened in parallelism with plate 207 by means of thumb nuts 210, as will be easily understood. Diametrically secured to ring R, as by means of the wing nuts 258, is a torch-supporting structure comprising a rack member 213 and a beam member 215. A torch-holding clamp 218 supported between members 213 and 215 is arranged to reciprocate upon rotation of a knob 220 which actuates a pinion 216 engaging rack 213, as shown in Fig. 12. A torch (not shown) may be secured in vertical position in clamp 218 by means of nuts 219 which are partially tightened. The torch may then be raised or lowered vertically by means of one or the other of knobs 222 which will be understood to cause rotation of a pinion for engaging rack teeth secured to the torch as previously described in connection with Fig. 5. The torch is then located from the center of ring 2 a distance corresponding to the radius of the circle which is to be cut from plate 207. It is clamped to members 213 and 215 by means of a clamp plate 223 and thumb screws 225 (Fig. 12).

Motor driven rotation of ring 18 then effects the cutting of a circular aperture in plate 207.

It will thus be seen that I have provided a device capable of cutting pipe at any predetermined angle with respect to the axis thereof and leaving an edge which is bevelled at any selected angle.

Having previously described the mechanism of my invention adapted to make right-angled, or variously directed cuts of a pipe section to which it is applied including circular cuts concentric with the axis of the pipe or inclined to said axis at varying angles, and also for making cuts through a pipe wall from lateral directions normal to the axis of the pipe, or inclined angularly thereto, and for making cuts from any desired lateral direction through the pipe wall about an axis which may be laterally offset with respect to the pipe axis, the different settings of the apparatus to achieve such desired results, will now be briefly described, reference being made to Figs. 14 to 21, inclusive, hereof.

Referring now first to Fig. 14, the torch T directed toward the axis of the pipe P, is revolved around said axis by virtue of the rotation of the rotatable ring portion 53 of the ring R, the stationary portion of which said ring being best shown at 18 in Fig. 1 and said ring encircling in substantially the manner shown in Fig. 2, and supported in the manner of Fig. 2 by the stand S, an end portion P2 may be severed from the main portion P1 of the pipe with the cut ends of the two sections being disposed in a plane at right angles to the axis of the pipe.

Fig. 15 represents substantially the same showing as in Fig. 14 except that the ring R is inclined to the axis of the pipe P so as to dispose the torch nozzle T in such a direction as to make a diagonal cut C of the pipe, said cut extending around the pipe to any desired extent and may extend as indicated by dotted lines C1 entirely around the pipe so as to separate the pipe into two sections, whereby the cut edges of the two sections may later be welded together with their edges in abutting relation but with one of the sections rotated 180° from its original position so that when the cut C is a 45° cut, the two subsequently joined sections will extend at right angles to each other.

Figure 16:
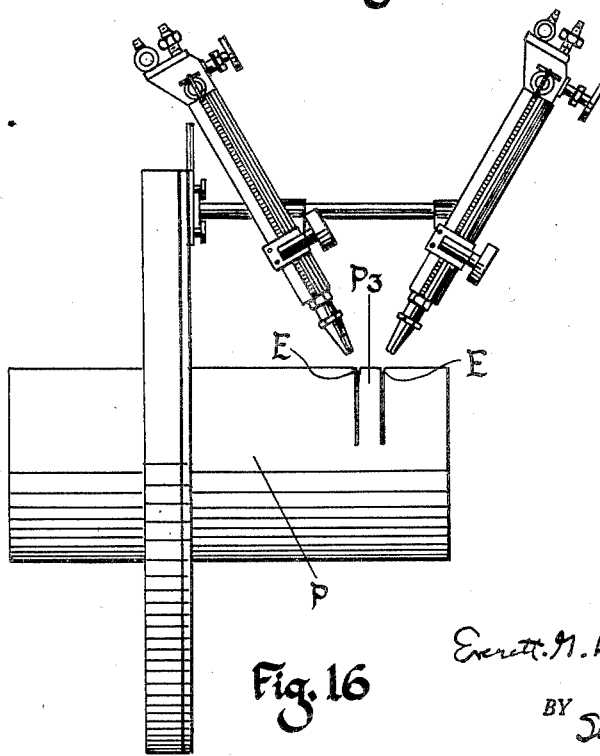
Fig. 16 shows, in side elevation, a pair of relatively converged torches carried on a torch holder of the type shown in Fig. 5 whereby two parallel circular cuts may be simultaneously achieved and at the same time as the short intermediate section is cut away providing the adjacent ends of the remaining sections with bevelled edges.

Fig. 16 illustrates the manner in which a short section P3 of the pipe P may be cut in such manner as to bevel the edges E of the remaining longer section, the entire operation of cutting out the ring P3 and beveling at E—E being accomplished simultaneously.

Figure 18:
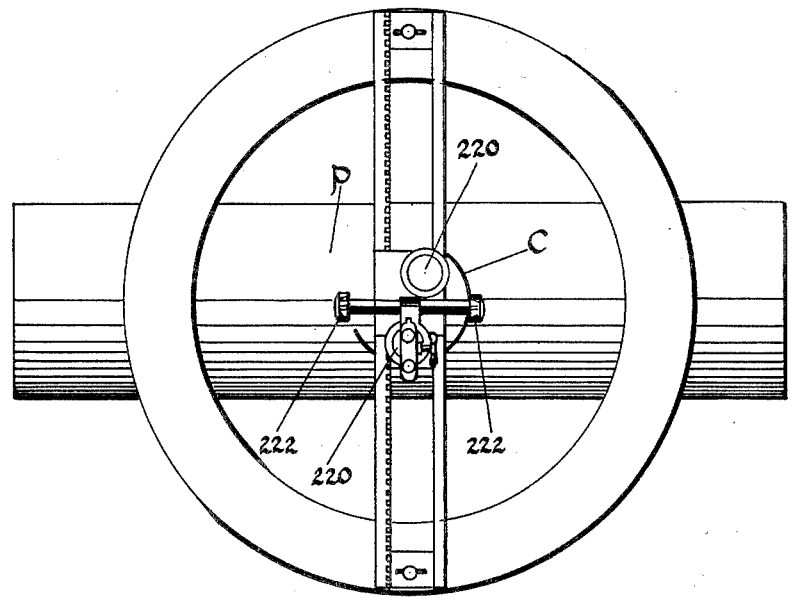
Figs. 17, 18 and 21 illustrate different settings of the ring carrying the torch holder in such manner that circular cuts may be made to provide circular apertures through a pipe wall, the axis of the cuts in the different figures being relatively differently directed.
Figure 17:
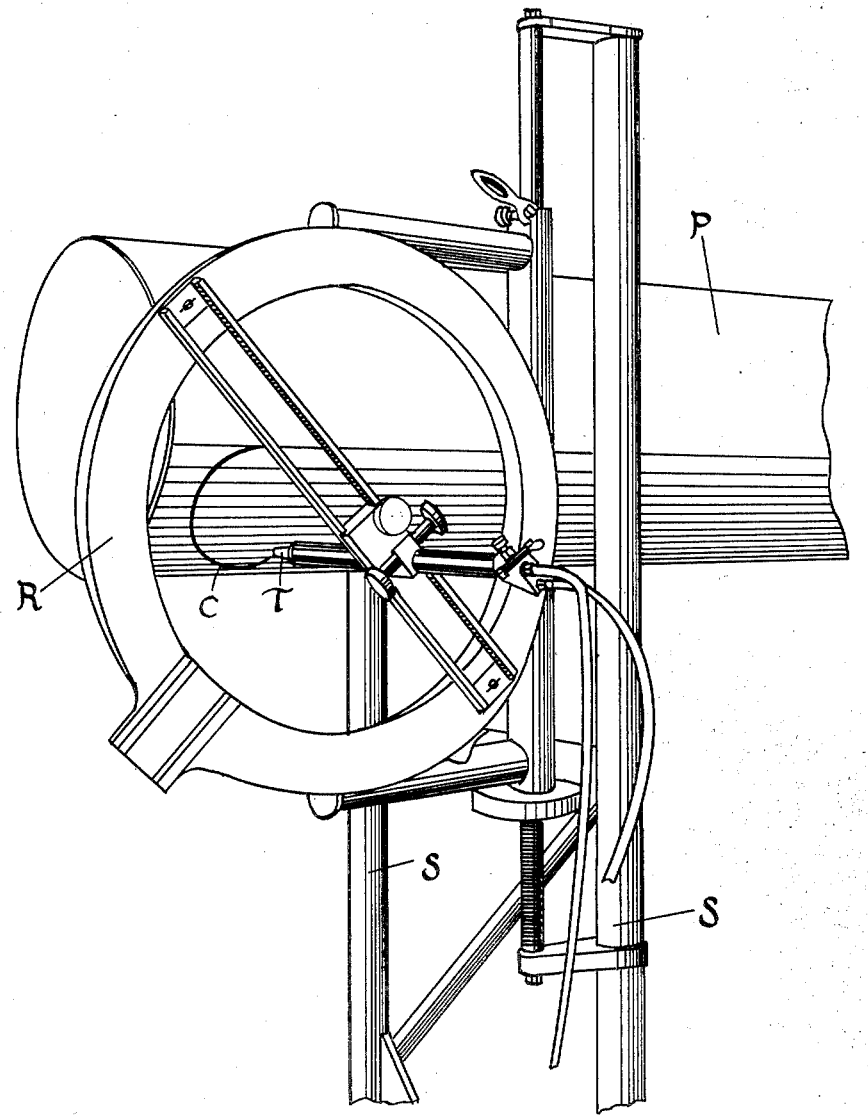
Figure 21:
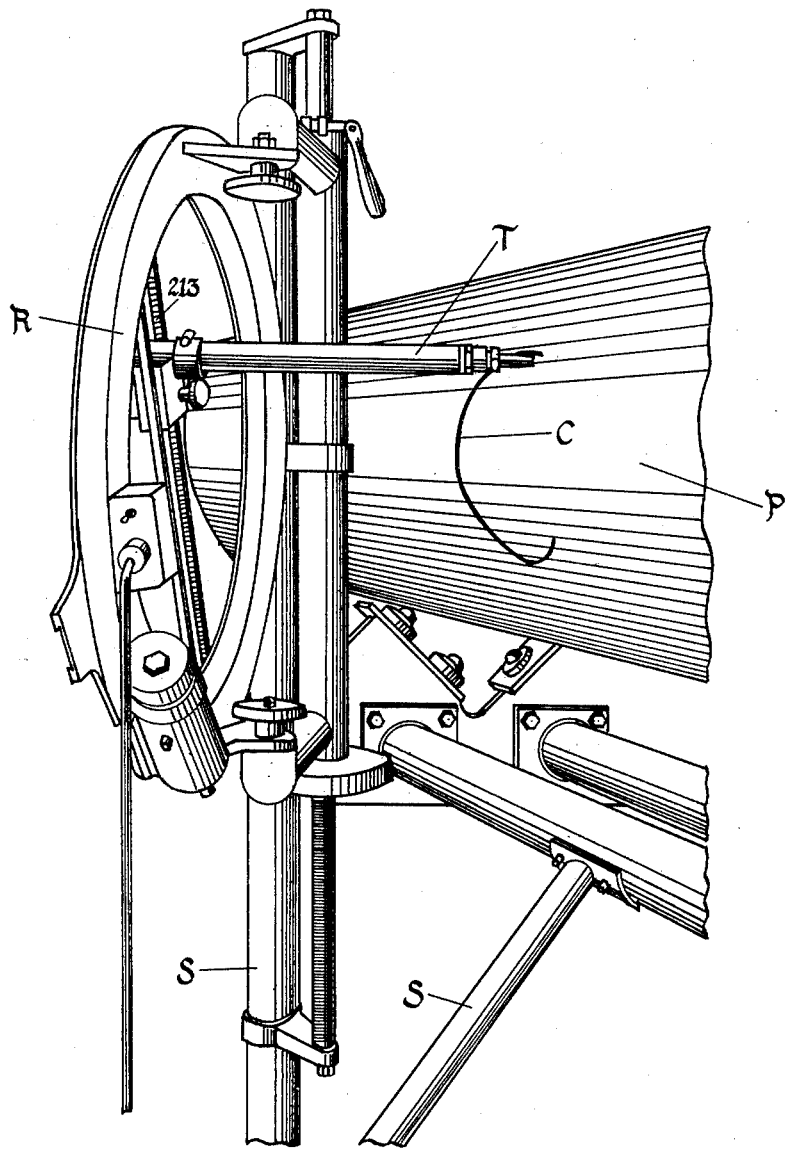

Figs. 17, 18 and 21 illustrate the positioning of the ring and the utilization of the means shown in Figs. 11, 12 and 13, for so disposing the torch holder 75 as to present its nozzle T in a proper direction with respect to the pipe P as to cut circular openings in the pipe, the cut C of Fig. 18 being made on an axis which extends in a direction which is normal to the axis of the pipe P, in Fig. 17 being made on an axis which doesn't intersect the axis of the pipe but is positioned at one side of said axis, or to make the cut on an axis which doesn't extend at right angles to the axis of the pipe, and as in Fig. 21 wherein the axis of the cut C is in converging relation to the pipe axis.

The positioning of the stand S and various mounting elements for the ring R and the adjustment of the torch carriage and torch holder have been previously described.

Figure 20:
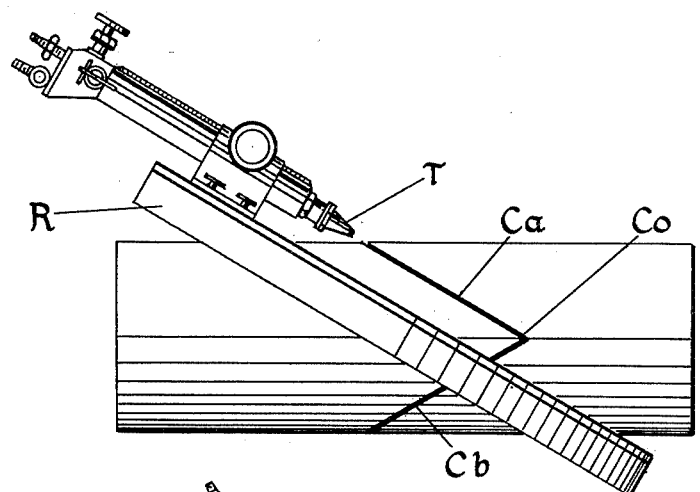
Figs. 19 and 20 show the ring which carries the torch holder of Fig. 4 telescoped over a pipe section and adapted to be successively inclined at two different angles with respect to the pipe axis, so as to achieve V-formed cuts, that of Fig. 20 being of greater acuteness than that of Fig. 19.
Figure 19:
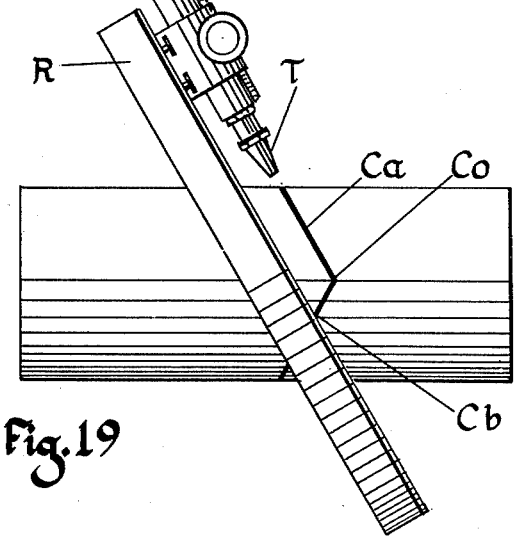

Figs. 19 and 20 are to be distinguished from the view of Fig. 15 in that, after making a cut part way through the pipe, with the ring R inclined to the pipe axis at a certain angle, the ring R is then swung on a horizontal axis which intersects the pipe axis to provide a second cut which is directed convergingly to the innermost portion of the first cut, the two cuts meeting at a point Co at opposite sides of the pipe, the two converging cuts, Ca and Cb in Figs. 19 and 20, converging at relatively different angles.

Having now related the manner in which cuts C of pipe sections may be variously made to provide sections which have end edges extending in different planes, some of the useful applications of the so-formed edges sections are shown in Figs. 22 to 28, inclusive, whereof—

Figure 22:
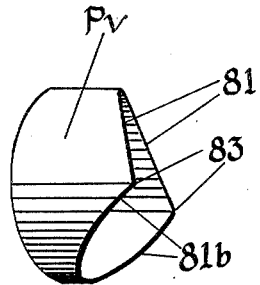
Fig. 22 shows in perspective a short pipe section, one end of which having been cut to V-form substantially in the manner shown in Fig. 19.

Fig. 22 shows an end portion of a pipe section Pv, the end edges of which are formed by cutting in the manner illustrated in Fig. 19 to provide a semi-circular portion 81a provided by such a cut as indicated at Ca of Fig. 19 and another semi-circular portion 81b, which is provided by a cut such as shown at Cb in Fig. 19, each of said cuts, and, therefore, each of said pipe and edge portions, being disposed in a plane, and the two planes shown, in the example, being intersecting in the horizontal middle of the pipe.

Figure 23:
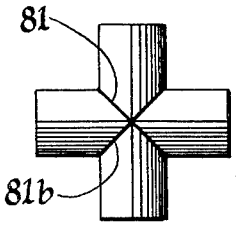

Fig. 23 shows a plurality of sections such as shown in Fig. 22, and four of such sections being joined together by welding edges such as 81a and 82b of the different sections.

Figure 24:
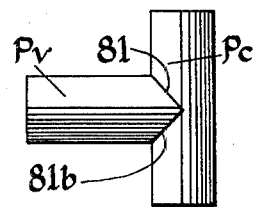

Fig. 24 is similar to Fig. 23, except that a pipe section Pc has a V-form cut projected from one side of the pipe section into which a section such as that shown in Fig. 22 at Pv is inserted and the parts being welded together at the juncture of the cut edges 81a and 81b with the similarly formed edges of the V-form cut in the section Pc.

Figure 25:
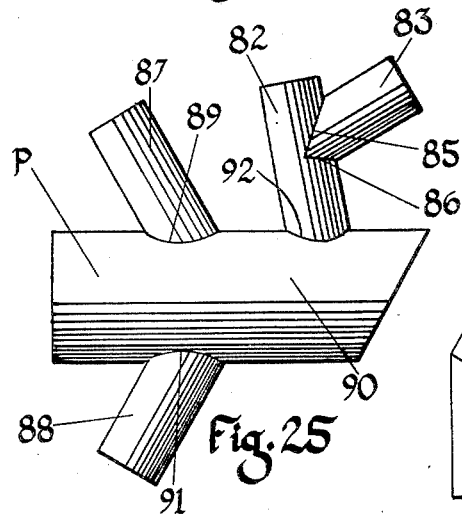

Fig. 25 shows a pair of sections 82 and 83 which are joined together in a manner similar to that of Fig. 24 except that the edge portions 85 and 86 of the V-form edge of the section 83 are of unequal length and are disposed in planes differently inclined with respect to the plane of the axis of the section 82. In Fig. 25, also, pipe branches 82, 87 and 88 are joined at one end to the larger pipe section 90 by welding operations.

The aperture 89 of the section 87, the aperture 91 of the section 88, and the aperture 92 of the section 82, are formed substantially in the manner shown in Fig. 21 where a cut C is shown as having been partially made, the torch-holding ring R being disposed entirely at one side of the pipe and the plane of the ring R being inclined at an acute angle to the vertical plane which passes through the axis of the pipe P and in making the cuts illustrated at C, Fig. 21, and variantly at 89, 91 and 92 in Fig. 25, these cuts being suitably made in each case by adjustment of the ring R either to a different angular relationship of its plane to the plane of the said pipe axis, and/or by relatively adjusting the position of the torch-holder T, Fig. 21, at its pinion and rack connection with the torch supporting rack 213, Figs. 11 and 21, the adjustment of the torch-holder on the rack being accomplished by turning one of the knobs 222, Figs. 11 and 12, which is carried on a shaft 280, Fig. 11, said shaft also carrying a gear pinion meshing with the pinion 220, mounted on a shaft also carrying the rack pinion 216, the teeth of which are meshed with the teeth 281 of the rack, 213. The method of swinging the ring R so as to vary the angularity of its plane with respect to the vertical plane which passes through the pipe axis has been previously described and the shape of the circular or ellipsoidal openings produced by the torch T on a pipe P in such operations as shown in Fig. 21, being readily determinable and corresponding to the line of intersection wherein a cylinder is considered to pierce a side of a larger cylinder when the first cylinder is projected in the direction outlined by the circular movement of the torch-holder T when the torch holding portion of the ring R is swung in such manner as to define a cylinder. Thus, where branches, such as 87, Fig. 25, have an end edge cut by the mechanism of my invention to a suitable form, its said edge may mate precisely with the edge of the aperture made, for example, as shown in Fig. 21, without any substantial portion of the edge 89 of the applied branch, such as 87 projecting interiorly of the larger pipe, such as 90, the engagement between the aperture edges and the branch edges being an abutting engagement or the branch may penetrate the aperture of the pipe to a depth corresponding to the thickness of the pipe wall.

Figure 27:
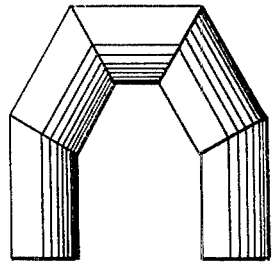
Figure 28:
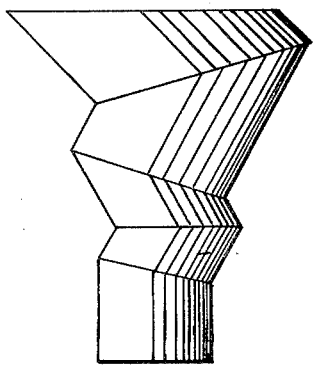
Figure 26:
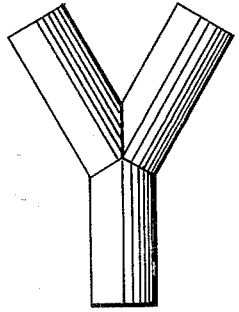
Figure 29:
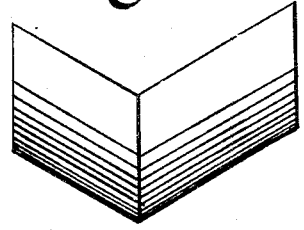

From the foregoing, the relatively simpler pipe structures of Figs. 26 to 29, inclusive, will be readily understood since these are formed by a butt-welding process to unite longitudinally disposed sections of pipe together; either the sections are all of the same diameter as in Figs. 27, 28 and 29, or of the same and different diameters as in Fig. 28, the procedure being to cut the different sections of each unit in such manner as to provide such sections with properly shaped end edges, of which Fig. 22, Figs. 15, 19 and 20 and the description relating thereto, clearly disclose the procedure for the different varying forms of end edges desired.

Having thus described my invention in various embodiments, and the method of employing the mechanism of my invention to perform different types of cutting operations, the method of accomplishing the same being herein disclosed in a number of various examples together with the showings herein of exemplary resultant products which may be fabricated with precision by the use of my said mechanism according to the described procedures. I am aware that numerous and extensive departures from the embodiments herein illustrated and described, and from the examples shown, the procedures, and from the resultant products, herein described without departing from the spirit of my invention and the scope of the appended claims.

I claim:

1. In a pipe-cutting device which includes a stand, a pipe clamp on the stand for fixedly securing a length of pipe in horizontal position, and a cutting torch supported by said stand in position to operate on said pipe; the combination of a torch supporting annulus, trunnions carried by said stand and supporting said annulus in a plurality of angularly adjusted positions, said trunnions being fixed to a hinge pintle carried by the stand to occupy a vertical axis at one side of the position of the pipe to be acted upon, said annulus comprising a base ring fixed against rotation and a rotatable ring carried by said fixed ring, bearings supporting said rotatable ring upon said fixed ring, an electric motor supported solely by said fixed ring, and gearing between said motor and said rotatable ring for driving the latter, and means for adjustably supporting a torch on said rotatable ring.

2. In a pipe-cutting device of the class described, the sub-combination comprising a cutting torch an adjustably mounted torch-carrying annulus, said annulus comprising a ring fixed against rotation about its axis, and a second ring carried by said fixed ring and rotatable relative thereto, a radially disposed clamping guide secured to said rotatable ring at one point on its circumference to adjustably receive a slide for supporting a torch, a slide assembly fitted to said clamping guide, said assembly comprising a pair of spaced substantially parallel forwardly extending arms, one disposed upon each side of the axis of the torch, a second pair of arms secured rearwardly to the torch body and extending forwardly alongside thereof, the forward ends of the corresponding adjacent arms of the two pairs being frictionally hinged together, whereby the angle of the torch with respect to the slide and to the work may be adjusted.

3. In a pipe-cutting device of the class described, the sub-combination comprising a cutting torch an adjustably mounted torch-carrying annulus, said annulus comprising a ring fixed against rotation about its axis, and a second ring carried by said fixed ring and rotatable relative thereto, a radially disposed clamping guide secured to said rotatable ring at one point on its circumference to adjustably receive a slide for supporting a torch, a slide assembly fitted to said clamping guide, said assembly comprising a pair of spaced substantially parallel forwardly extending arms, one disposed upon each side of the axis of the torch, a second pair of arms secured rearwardly to the torch body and extending forwardly alongside thereof, the forward ends of the corresponding adjacent arms of the two pairs being frictionally hinged together, whereby the angle of the torch with respect to the slide and to the work may be adjusted, and a yoke member straddling the forward end of the torch body and having its ends also frictionally secured to the frictionally connected link ends.

4. In a pipe-cutting device of the class described, the sub-combination comprising a cutting torch an adjustably mounted torch-carrying annulus, said annulus comprising a ring fixed against rotation about its axis, and a second ring carried by said fixed ring and rotatable relative thereto, a radially disposed clamping guide secured to said rotatable ring at one point on its circumference to adjustably receive a side for supporting a torch, a slide assembly fitted to said clamping guide, said assembly comprising a pair of spaced substantially parallel forwardly extending arms, one disposed upon each side of the axis of the torch, a second pair of arms secured rearwardly to the torch body and extending forwardly alongside thereof, the forward ends of the corresponding adjacent arms of the two pairs being frictionally hinged together, whereby the angle of the torch with respect to the slide and to the work may be adjusted, the frictional securement of the respective link ends on the opposite sides of the forward end of the torch body being accomplished by means of pins having eccentric portions passing respectively through the links, whereby the relative distance of the torch tip from the work may be maintained regardless of the angular position through which the torch body may be swung.

5. A pipe-cutting trestle comprising a clamping device for supporting a length of pipe in substantially horizontal position, supporting legs for said trestle, an upwardly extending mast at one side of and adjacent one end of said trestle, a trunnion member comprising a vertical element supported by and swingable about said mast while maintaining said vertical position, and two arms extending horizontally from the respective upper and lower ends of said element, friction hinge members on the ends of said arms, and a torch carrying annulus connected at diametrically opposite points on its circumference to said friction hinge members, a torch-supporting bracket revolubly supported on said annulus, and means for travelling said torch-supporting bracket about the annulus, all whereby said trunnion member may be swung relative to said mast and trestle to position the torch carrying annulus for traversal of the torch either around the circumference of the pipe, or around an axis at an angle to the axis of the pipe to make a cut in the wall thereof.

6. A pipe-cutting trestle comprising a clamping device for supporting a length of pipe in substantially horizontal position, tubular supporting legs for said trestle, one of the legs being prolonged upwardly beyond the position of the pipe to provide an upwardly extending mast at one side of and adjacent one end of the trestle, a trunnion member comprising a vertical element supported by and swingable about said mast while maintaining said vertical position, and two arms extending horizontally from the respective upper and lower ends of said element, friction hinge members on the ends of said arms, and a torch carrying annulus connected at diametrically opposite points on its circumference to said friction hinge members, a torch-supporting bracket revolubly supported on said annulus, and means for travelling said torch-supporting bracket about the annulus, all whereby said trunnion member may be swung relative to said mast and trestle to position the torch carrying annulus for traversal of the torch either around the circumference of the pipe, or around an axis at an angle to the axis of the pipe to make a cut in the wall thereof, and means for vertically adjusting said trunnion member relative to said mast.

7. A pipe-cutting trestle comprising a clamping device for supporting a length of pipe in substantially horizontal position, supporting legs for said trestle, an upwardly extending mast at one side of and adjacent one end of said trestle, horizontally extending pivoted links carried by and projecting from upper and lower portions of said mast, a vertical rod carried by said links and extending from one to the other, a tubular trunnion member surrounding said rod and provided with bearings for rotation about the rod, threads on at least the lower portion of said rod, and a manually rotatable nut carried by the threaded portion of said rod and serving to support said trunnion thereon, whereby rotation of the nut will raise and lower the adjusted position of said trunnion member, and two arms extending horizontally from the respective upper and lower ends of said trunnion element, friction hinge member on the ends of said arms, and a torch carrying annulus connected at diametrically opposite points on its circumference to said friction hinge members, a torch-supporting bracket revolubly supported on said annulus, and means for travelling said torch-supporting bracket about the annulus, all whereby said trunnion member may be swung relative to said mast and trestle to position the torch carrying annulus for traversal of the torch either around the circumference of the pipe, or around an axis at an angle to the axis of the pipe to make a cut in the wall thereof.

8. A readily portable pipe-cutting trestle comprising a clamping device for supporting a length of pipe in substantially horizontal position, supporting legs for said trestle, a vertical post extending upwardly from said trestle alongside of said clamping device and thus at the side of the position the length of pipe occupies during operation, a pair of vertically spaced parallel arms pivotally and vertically adjustably connected to said post and adapted to swing to and from planes parallel with and perpendicular to the axis of the pipe position, means for adjusting said arms in desired vertical positions and also in selected horizontally pivoted positions, a torch-carrying annulus, means for rigidly connecting said annulus to both of said arms, a torch-supporting bracket revolubly supported on said annulus, and means for travelling said torch-supporting bracket about said annulus, all whereby said annulus and arms may be swung as a unit about said pivot to position the torch-carrying annulus for traversal of the torch either around the circumference of the pipe or around an axis at an angle to the axis of the pipe to make a cut in the wall thereof.

9. In a cutting machine of the class described, in combination, a support, an annular torch-carrying member disposed upon said support to be positioned adjacent the work to be cut thereby, said member comprising an annular base ring rigidly attached to the support and adapted to occupy a stationary position relative to the work, said base ring being channel shaped having an axially projecting parallel circular flange at each margin, a rotatable torch-carrying ring plate disposed axially outwardly of the base ring and closing off said channel-shaped base ring forming a closed box-like annular chamber within the member, a ring gear secured to said ring plate and disposed within said chamber, guiding and supporting rollers carried within said fixed channel base ring interengaging guide flanges on said ring gear and ring plate combination and said supporting rollers respectively, a pinion rotatably carried by said base ring and meshing with said ring gear, and means for rotating said pinion.

10. In a pipe cutting device of the class described, the sub-combination which comprises an adjustably mounted multiple-function torch-carrying annulus; said annulus comprising a base ring fixed against rotation about its axis, a rotatable ring carried by said base ring, concentric therewith and rotatable relatively thereto; a radially disposed clamping guide fixedly secured to said rotatable ring at one point on its circumference to adjustably receive a slide for supporting a torch for use in accomplishing a cutting operation; a guide track adapted to extend diametrically across said rotatable ring from one side to the other, means for detachably securing the opposite ends of said track to diametrically opposite points on said rotatable ring, a torch carriage slidably supported by said track, a rack carried by said track longitudinally thereof, a pinion on the torch carriage meshing with said rack, and manual means for rotating said pinion to traverse the track carriage.

EVERETT G. LIVESAY.

REFERENCES CITED

The following references are of record in the file of this patent:

UNITED STATES PATENTS

| Number | Name | Date |
|---|---|---|
| 1,049,807 | Buchnam | Jan. 7, 1913 |
| 1,172,933 | Buchnam | Feb. 22, 1916 |
| 1,176,584 | Madgett | Mar. 21, 1916 |
| 1,238,257 | Butler | Aug. 28, 1917 |
| 1,529,954 | Irvin et al. | Mar. 17, 1925 |
| 1,684,476 | Cullen et al. | Sept. 18, 1928 |
| 1,852,413 | Hickey | Apr. 5, 1932 |
| 1,861,923 | Jones et al. | June 7, 1932 |
| 2,061,442 | Summers | Nov. 17, 1936 |
| 2,063,498 | Glick | Dec. 8, 1936 |
| 2,090,431 | Stover | Aug. 17, 1937 |
| 2,242,448 | Buchnam et al. | Mar. 20, 1941 |
| 2,269,505 | Anderson | Jan 13, 1942 |

FOREIGN PATENTS

| Number | Country | Date |
|---|---|---|
| 36,742 | Switzerland | Mar. 14, 1906 |